(12) United States Patent
Denis et al.

(10) Patent No.: US 8,506,756 B2
(45) Date of Patent: Aug. 13, 2013

(54) EMBOSSED SHEET COMPRISING A PLY OF WATER-SOLUBLE MATERIAL AND METHOD FOR MANUFACTURING SUCH A SHEET

(75) Inventors: Yoann Denis, Selestat (FR); Hubert Pfister, Rorschwihr (FR)

(73) Assignee: SCA Tissue France, Bois-Colombes (FR)

( * ) Notice: Subject to any disclaimer, the term of this patent is extended or adjusted under 35 U.S.C. 154(b) by 0 days.

(21) Appl. No.: 12/920,776

(22) PCT Filed: Mar. 4, 2009

(86) PCT No.: PCT/FR2009/000231
§ 371 (c)(1),
(2), (4) Date: Sep. 2, 2010

(87) PCT Pub. No.: WO2009/115705
PCT Pub. Date: Sep. 24, 2009

(65) Prior Publication Data
US 2010/0326613 A1    Dec. 30, 2010

(30) Foreign Application Priority Data
Mar. 6, 2008  (FR) ..................................... 08 51455

(51) Int. Cl.
*D21H 27/40*    (2006.01)
*D21H 27/32*    (2006.01)
*B31F 1/07*    (2006.01)
*B31F 5/04*    (2006.01)
*B32B 29/06*    (2006.01)

(52) U.S. Cl.
USPC ........... 162/117; 162/109; 162/124; 162/132; 162/158; 428/156; 428/172; 428/537.5

(58) Field of Classification Search
USPC .............. 162/109, 117, 123–133, 158, 164.1, 162/168.1; 428/156, 172, 195.1, 537.5; 156/209, 219; 264/284
See application file for complete search history.

(56) References Cited

U.S. PATENT DOCUMENTS

| 1,682,346 A | 8/1928 | Lorenz |
| 2,117,256 A | 5/1938 | Ration |

(Continued)

FOREIGN PATENT DOCUMENTS

| DE | 10342201 | 4/2005 |
| EP | 0097036 | 12/1983 |

(Continued)

OTHER PUBLICATIONS

Papermaking and Paperboard Making, Roland G. MacDonald & John N. Franklin, eds., 50-55 (2nd ed., 1970).

(Continued)

*Primary Examiner* — Jose A Fortuna
(74) *Attorney, Agent, or Firm* — Drinker Biddle & Reath LLP (57) ABSTRACT

The invention proposes an embossed sheet (10) comprising at least one ply (12) of tissue having an embossing pattern comprising at least one series of protuberances (18) formed projecting from one surface of the said ply (12) of tissue, and at least one ply joined to the said at least one ply (12) of tissue and located opposite the said surface of the ply (14) of water-soluble material,
characterized in that the ply (14) of water-soluble material is joined to the said at least one ply (12) of tissue at the summits (18a) of at least part of the protuberances (18).
The invention also proposes a method for manufacturing such a multi-ply sheet (10).

10 Claims, 2 Drawing Sheets

(56) References Cited

U.S. PATENT DOCUMENTS

| | | | |
|---|---|---|---|
| 2,123,982 | A | 7/1938 | Wiles |
| 2,142,986 | A | 1/1939 | Arnold, Jr. |
| 2,546,705 | A | 3/1951 | Strawinski |
| 2,755,213 | A | 7/1956 | Hedstrom |
| 2,797,168 | A | 6/1957 | Gimler |
| 2,897,108 | A | 7/1959 | Harwood |
| 2,897,109 | A | 7/1959 | Voigtman |
| 2,961,367 | A | 11/1960 | Weisgerber et al. |
| 3,084,092 | A | 4/1963 | Arlt, Jr. |
| 3,130,111 | A | 4/1964 | Izumi |
| 3,212,961 | A | 10/1965 | Weisgerber et al. |
| 3,261,740 | A | 7/1966 | Wells |
| 2,824,815 | A | 2/1968 | Downs et al. |
| 3,414,459 | A | 12/1968 | Wells |
| 3,546,716 | A | 12/1970 | Laumann |
| 3,554,195 | A | 1/1971 | Murdoch |
| 3,607,348 | A | 9/1971 | Wray |
| 3,612,054 | A | 10/1971 | Matsuda et al. |
| 3,650,882 | A | 3/1972 | Thomas |
| 3,654,064 | A | 4/1972 | Laumann |
| 3,669,822 | A | 6/1972 | Cowen |
| 3,673,060 | A | 6/1972 | Murphy et al. |
| 3,684,603 | A | 8/1972 | Ittins |
| 3,833,937 | A | 9/1974 | Taylor |
| 3,867,225 | A | 2/1975 | Nystrand |
| 3,868,205 | A | 2/1975 | Thomas |
| 3,916,447 | A | 11/1975 | Thompson |
| 3,925,127 | A | 12/1975 | Yoshioka |
| 3,926,700 | A | 12/1975 | Hopkins, Jr. et al. |
| 3,953,638 | A | 4/1976 | Kemp |
| 3,960,272 | A | 6/1976 | Hartbauer et al. |
| 3,978,553 | A | 9/1976 | Honig |
| 4,018,647 | A | 4/1977 | Wietsma |
| 4,071,651 | A | 1/1978 | Hicklin et al. |
| 4,074,959 | A | 2/1978 | Curry et al. |
| 4,075,382 | A | 2/1978 | Chapman et al. |
| 4,100,017 | A | 7/1978 | Flautt |
| 4,113,911 | A | 9/1978 | LaFitte et al. |
| 4,117,199 | A | 9/1978 | Gotoh et al. |
| 4,145,464 | A | 3/1979 | McConnell et al. |
| 4,196,245 | A | 4/1980 | Kitson et al. |
| 4,276,339 | A | 6/1981 | Stoveken |
| 4,287,251 | A | 9/1981 | King et al. |
| 4,288,877 | A | 9/1981 | Klepfer |
| 4,302,853 | A | 12/1981 | Mesek |
| 4,330,888 | A | 5/1982 | Klepfer |
| 4,349,610 | A | 9/1982 | Parker |
| 4,377,615 | A | 3/1983 | Suzuki et al. |
| 4,447,484 | A | 5/1984 | Slosberg et al. |
| 4,469,735 | A | 9/1984 | Trokhan |
| 4,489,118 | A | 12/1984 | Endres et al. |
| 4,537,822 | A | 8/1985 | Nanri et al. |
| 4,559,243 | A | 12/1985 | Passler et al. |
| 4,574,021 | A | 3/1986 | Endres et al. |
| 4,601,938 | A | 7/1986 | Deacon et al. |
| 4,610,915 | A | 9/1986 | Crenshaw et al. |
| 4,618,524 | A | 10/1986 | Groitzsch et al. |
| 4,637,949 | A | 1/1987 | Manning et al. |
| 4,648,876 | A | 3/1987 | Becker et al. |
| 4,657,538 | A | 4/1987 | Becker et al. |
| 4,657,946 | A | 4/1987 | Rende et al. |
| 4,660,224 | A | 4/1987 | Ashcraft |
| 4,695,422 | A | 9/1987 | Curro et al. |
| 4,786,367 | A | 11/1988 | Bogart et al. |
| 4,788,100 | A | 11/1988 | Janssen et al. |
| 4,789,564 | A | 12/1988 | Kanner et al. |
| 4,806,183 | A | 2/1989 | Williams |
| 4,816,320 | A | 3/1989 | St. Cyr |
| 4,885,202 | A | 12/1989 | Lloyd et al. |
| 4,924,527 | A | 5/1990 | Hintermeyer |
| 4,927,588 | A | 5/1990 | Schulz |
| 4,938,515 | A | 7/1990 | Fazio |
| 4,950,545 | A | 8/1990 | Walter et al. |
| 4,987,632 | A | 1/1991 | Rowe et al. |
| 5,062,158 | A | 11/1991 | Oka et al. |
| 5,093,068 | A | 3/1992 | Schulz |
| 5,128,182 | A | 7/1992 | Bunker et al. |
| 5,158,523 | A | 10/1992 | Houk et al. |
| 5,167,766 | A | 12/1992 | Honig et al. |
| 5,171,808 | A | 12/1992 | Ryles et al. |
| 5,173,351 | A | 12/1992 | Ruppel et al. |
| 5,180,471 | A | 1/1993 | Sauer et al. |
| 5,196,244 | A | 3/1993 | Beck |
| 5,223,096 | A | 6/1993 | Phan et al. |
| 5,227,242 | A | 7/1993 | Walter et al. |
| 5,252,754 | A | 10/1993 | Bottorff |
| 5,260,536 | A | 11/1993 | Peery |
| 5,397,435 | A | 3/1995 | Ostendorf et al. |
| 5,399,366 | A | 3/1995 | Geddes et al. |
| 5,407,537 | A | 4/1995 | Malatesta et al. |
| 5,437,766 | A | 8/1995 | Van Phan et al. |
| 5,437,908 | A | 8/1995 | Demura et al. |
| 5,443,889 | A | 8/1995 | Ruppel et al. |
| 5,449,551 | A | 9/1995 | Taniguchi |
| 5,456,968 | A | 10/1995 | Jones |
| 5,467,936 | A | 11/1995 | Moody |
| 5,503,919 | A | 4/1996 | Litchholt et al. |
| 5,514,435 | A | 5/1996 | Suzuki et al. |
| 5,543,202 | A | 8/1996 | Clark et al. |
| 5,550,167 | A | 8/1996 | DesMarais |
| 5,552,187 | A | 9/1996 | Green et al. |
| 5,552,200 | A | 9/1996 | Gureff |
| 5,560,945 | A | 10/1996 | Geddes et al. |
| 5,562,805 | A | 10/1996 | Kamps et al. |
| 5,563,179 | A | 10/1996 | Stone et al. |
| 5,571,849 | A | 11/1996 | DeMarais |
| 5,578,369 | A | 11/1996 | Nohr et al. |
| 5,582,674 | A | 12/1996 | Patterson et al. |
| 5,585,129 | A | 12/1996 | Geddes et al. |
| 5,595,807 | A | 1/1997 | Gooding, Jr. et al. |
| 5,601,871 | A | 2/1997 | Krzysik et al. |
| 5,601,930 | A | 2/1997 | Mehta et al. |
| 5,609,901 | A | 3/1997 | Geddes et al. |
| 5,614,293 | A | 3/1997 | Krzysik et al. |
| 5,622,734 | A | 4/1997 | Clark et al. |
| 5,635,201 | A | 6/1997 | Fabo |
| 5,635,279 | A | 6/1997 | Ma et al. |
| 5,650,218 | A | 7/1997 | Krzysik et al. |
| 5,658,639 | A | 8/1997 | Curro et al. |
| 5,665,426 | A | 9/1997 | Krzysik et al. |
| 5,693,406 | A | 12/1997 | Wegele et al. |
| 5,695,487 | A | 12/1997 | Cohen et al. |
| 5,695,608 | A | 12/1997 | Yagi et al. |
| 5,698,291 | A | 12/1997 | Clark et al. |
| 5,716,692 | A | 2/1998 | Warner et al. |
| 5,736,223 | A | 4/1998 | Laurent |
| 5,766,736 | A | 6/1998 | Baumuller |
| 5,792,404 | A | 8/1998 | Cree et al. |
| 5,830,558 | A | 11/1998 | Barnholtz |
| 5,849,000 | A | 12/1998 | Anjur et al. |
| 5,851,352 | A | 12/1998 | Vinson et al. |
| 5,858,173 | A | 1/1999 | Propst, Jr. |
| 5,858,554 | A | 1/1999 | Neal et al. |
| 5,864,878 | A | 2/1999 | Mashrick |
| 5,882,464 | A | 3/1999 | Theisgen et al. |
| 5,885,697 | A | 3/1999 | Krzysik et al. |
| 5,904,812 | A | 5/1999 | Salman et al. |
| 5,906,711 | A | 5/1999 | Barnholtz |
| 5,919,556 | A | 7/1999 | Barnholtz |
| 5,930,836 | A | 8/1999 | Morris |
| 5,932,316 | A | 8/1999 | Cree et al. |
| 5,968,853 | A | 10/1999 | Kelly et al. |
| 5,990,377 | A | 11/1999 | Chen et al. |
| 6,015,935 | A | 1/2000 | LaVon et al. |
| 6,025,049 | A | 2/2000 | Ouellette et al. |
| 6,027,611 | A | 2/2000 | McFarland et al. |
| 6,030,497 | A | 2/2000 | Watkins |
| 6,045,900 | A | 4/2000 | Haffner et al. |
| 6,046,378 | A | 4/2000 | Quincy, III et al. |
| 6,054,020 | A | 4/2000 | Goulet et al. |
| 6,066,379 | A | 5/2000 | Ma et al. |
| 6,074,525 | A | 6/2000 | Richards |
| 6,107,539 | A | 8/2000 | Palumbo et al. |
| 6,129,972 | A | 10/2000 | McNeil et al. |

| | | |
|---|---|---|
| 6,132,803 A | 10/2000 | Kelly et al. |
| 6,136,422 A | 10/2000 | Lichtenberg et al. |
| 6,149,769 A | 11/2000 | Mohammadi et al. |
| 6,159,339 A | 12/2000 | Hassler et al. |
| 6,162,327 A | 12/2000 | Batra et al. |
| 6,165,585 A | 12/2000 | Trokhan |
| 6,180,052 B1 | 1/2001 | Ouellette et al. |
| 6,180,214 B1 | 1/2001 | Nissing et al. |
| 6,182,290 B1 | 2/2001 | Morris |
| 6,187,141 B1 | 2/2001 | Takeuchi et al. |
| 6,187,695 B1 | 2/2001 | Krzysik et al. |
| 6,203,889 B1 | 3/2001 | Quincy, III et al. |
| 6,207,734 B1 | 3/2001 | Vinson et al. |
| 6,221,211 B1 | 4/2001 | Hollenberg et al. |
| 6,231,948 B1 | 5/2001 | Ouellette et al. |
| 6,232,521 B1 | 5/2001 | Bewick-Sonntag et al. |
| 6,238,519 B1 | 5/2001 | Jones et al. |
| 6,267,842 B1 | 7/2001 | Ona et al. |
| 6,270,875 B1 | 8/2001 | Nissing |
| 6,277,226 B1 * | 8/2001 | Schulz ................... 156/209 |
| 6,286,145 B1 | 9/2001 | Welchel et al. |
| 6,300,409 B2 | 10/2001 | Lau et al. |
| 6,309,731 B1 * | 10/2001 | Takeuchi et al. ........... 428/154 |
| 6,328,850 B1 | 12/2001 | Phan et al. |
| 6,332,952 B1 | 12/2001 | Hsu et al. |
| 6,334,220 B1 | 1/2002 | Frye |
| 6,372,035 B1 | 4/2002 | Juppo et al. |
| 6,372,064 B1 | 4/2002 | Butterworth et al. |
| 6,379,497 B1 | 4/2002 | Sandstrom |
| 6,383,960 B1 | 5/2002 | Everett et al. |
| 6,402,871 B1 | 6/2002 | Canary |
| 6,403,858 B1 | 6/2002 | Quincy et al. |
| 6,416,624 B1 | 7/2002 | Nielsen et al. |
| 6,416,628 B1 | 7/2002 | Huang et al. |
| 6,427,240 B1 | 8/2002 | Royal |
| 6,436,234 B1 | 8/2002 | Chen et al. |
| 6,439,388 B1 | 8/2002 | Lerner et al. |
| 6,440,268 B1 | 8/2002 | Baggot et al. |
| 6,444,091 B1 | 9/2002 | Ward et al. |
| 6,454,693 B1 | 9/2002 | Harlacher et al. |
| 6,454,902 B1 | 9/2002 | Chen |
| 6,458,243 B1 | 10/2002 | Jones et al. |
| 6,464,829 B1 | 10/2002 | Chen et al. |
| 6,478,927 B1 | 11/2002 | Chen et al. |
| 6,490,731 B1 | 12/2002 | Hyatt et al. |
| 6,494,990 B2 | 12/2002 | Bazaj et al. |
| 6,537,407 B1 | 3/2003 | Law et al. |
| 6,544,386 B1 | 4/2003 | Krzysik et al. |
| 6,548,427 B1 | 4/2003 | Shannon et al. |
| 6,551,691 B1 | 4/2003 | Hoeft et al. |
| 6,572,722 B1 | 6/2003 | Pratt |
| 6,573,203 B1 | 6/2003 | McConnell et al. |
| 6,576,049 B1 | 6/2003 | Dilts et al. |
| 6,585,859 B1 | 7/2003 | Hangkansson |
| 6,589,634 B2 | 7/2003 | Schultz et al. |
| 6,599,614 B1 | 7/2003 | Roussel et al. |
| 6,602,387 B1 | 8/2003 | Loughran et al. |
| 6,607,630 B2 | 8/2003 | Bartman et al. |
| 6,607,636 B2 | 8/2003 | Ross et al. |
| 6,616,806 B2 | 9/2003 | Chen |
| 6,635,134 B1 | 10/2003 | Lichtenberg et al. |
| 6,649,025 B2 | 11/2003 | Mills et al. |
| 6,656,596 B1 | 12/2003 | Gardner, Jr. |
| 6,666,952 B2 | 12/2003 | Dilts et al. |
| 6,673,983 B1 | 1/2004 | Graef |
| 6,716,312 B2 | 4/2004 | Kehrer et al. |
| 6,722,606 B2 | 4/2004 | Hanson et al. |
| 6,723,204 B2 | 4/2004 | Van Handel et al. |
| 6,727,004 B2 | 4/2004 | Goulet et al. |
| 6,733,608 B1 | 5/2004 | Baggot et al. |
| 6,733,866 B2 | 5/2004 | Muller |
| 6,746,558 B2 | 6/2004 | Hoeft et al. |
| 6,755,928 B1 | 6/2004 | Biagiotti |
| 6,755,938 B2 | 6/2004 | Kehrer et al. |
| 6,758,923 B2 | 7/2004 | Butterworth et al. |
| 6,758,943 B2 | 7/2004 | McConnell et al. |
| 6,773,647 B2 | 8/2004 | McGuire et al. |
| 6,805,766 B1 | 10/2004 | Roussel et al. |
| 6,811,652 B2 | 11/2004 | Hollmark |
| 6,824,649 B2 | 11/2004 | Jewell et al. |
| 6,827,819 B2 | 12/2004 | Dwiggins et al. |
| 6,837,972 B2 | 1/2005 | Marsh |
| 6,863,107 B2 | 3/2005 | Hein et al. |
| 6,884,494 B1 * | 4/2005 | Curro et al. .................... 428/196 |
| 6,896,766 B2 | 5/2005 | Sarbo |
| 6,896,767 B2 | 5/2005 | Wilhelm |
| 6,896,768 B2 * | 5/2005 | Dwiggins et al. ............. 162/123 |
| 6,911,573 B2 | 6/2005 | Chen |
| 6,913,673 B2 | 7/2005 | Baggot et al. |
| 6,916,403 B2 | 7/2005 | Basler et al. |
| 6,919,111 B2 | 7/2005 | Swoboda |
| 6,924,042 B2 | 8/2005 | Von Paleske |
| 6,936,330 B2 | 8/2005 | Fereshtehkhou et al. |
| 6,939,441 B2 | 9/2005 | Nurminen et al. |
| 6,949,167 B2 | 9/2005 | Shannon et al. |
| 6,964,725 B2 | 11/2005 | Shannon et al. |
| 6,992,028 B2 | 1/2006 | Thomaschefsky et al. |
| 7,026,037 B2 | 4/2006 | Lefebvre Du Grosriez et al. |
| 7,029,546 B2 | 4/2006 | Basler et al. |
| 7,063,766 B2 | 6/2006 | Saarvali et al. |
| 7,214,633 B2 | 5/2007 | Sun et al. |
| 7,250,448 B2 | 7/2007 | Walchuk et al. |
| 7,282,273 B2 | 10/2007 | Murphy et al. |
| 7,300,547 B2 | 11/2007 | Luu et al. |
| 7,381,299 B2 | 6/2008 | Shannon et al. |
| 7,497,923 B2 | 3/2009 | Ward et al. |
| 7,507,781 B2 | 3/2009 | Walchuk et al. |
| 7,662,257 B2 | 2/2010 | Edwards et al. |
| 7,666,272 B2 | 2/2010 | Williams et al. |
| 7,666,273 B2 | 2/2010 | Williams et al. |
| 7,794,566 B2 | 9/2010 | Edwards et al. |
| 7,799,169 B2 | 9/2010 | Bhat et al. |
| 2001/0009180 A1 | 7/2001 | Welch et al. |
| 2001/0051687 A1 | 12/2001 | Bazaj et al. |
| 2002/0060000 A1 | 5/2002 | Du Grosriez et al. |
| 2002/0088578 A1 | 7/2002 | Jones et al. |
| 2002/0096280 A1 | 7/2002 | Jones et al. |
| 2002/0096282 A1 | 7/2002 | Leibler et al. |
| 2002/0103469 A1 | 8/2002 | Chen et al. |
| 2002/0114933 A1 | 8/2002 | Gould |
| 2002/0170649 A1 | 11/2002 | Butterworth et al. |
| 2002/0195218 A1 | 12/2002 | Chen |
| 2003/0008109 A1 | 1/2003 | Basler et al. |
| 2003/0021952 A1 | 1/2003 | Zink et al. |
| 2003/0021953 A1 | 1/2003 | Graff |
| 2003/0026953 A1 | 2/2003 | Muller |
| 2003/0045844 A1 | 3/2003 | Taylor et al. |
| 2003/0056917 A1 | 3/2003 | Jimenez |
| 2003/0070782 A1 | 4/2003 | Proverb et al. |
| 2003/0075262 A1 | 4/2003 | Ferdinand et al. |
| 2003/0075292 A1 | 4/2003 | Kehrer et al. |
| 2003/0111196 A1 | 6/2003 | Hu |
| 2003/0111198 A1 | 6/2003 | Hu |
| 2003/0116292 A1 | 6/2003 | Hollmark |
| 2003/0116294 A1 | 6/2003 | Kehrer et al. |
| 2003/0119397 A1 | 6/2003 | Von Paleske |
| 2003/0121628 A1 | 7/2003 | Mills et al. |
| 2003/0121629 A1 | 7/2003 | Hu |
| 2003/0121632 A1 | 7/2003 | Nurminen et al. |
| 2003/0121633 A1 | 7/2003 | Spence et al. |
| 2003/0127203 A1 | 7/2003 | Hu |
| 2003/0129363 A1 | 7/2003 | Hoeft et al. |
| 2003/0131960 A1 | 7/2003 | McConnell et al. |
| 2003/0152724 A1 | 8/2003 | Swoboda et al. |
| 2003/0188840 A1 | 10/2003 | Van Handel |
| 2003/0192664 A1 | 10/2003 | Kulick et al. |
| 2003/0201083 A1 | 10/2003 | Marsh |
| 2003/0203195 A1 | 10/2003 | Marsh |
| 2003/0205165 A1 | 11/2003 | Thornton et al. |
| 2003/0205167 A1 | 11/2003 | Dilts et al. |
| 2003/0215602 A1 * | 11/2003 | Andersson et al. ........... 428/116 |
| 2004/0003905 A1 | 1/2004 | Hilbig |
| 2004/0009327 A1 | 1/2004 | Saarvali et al. |
| 2004/0018369 A1 | 1/2004 | Goulet et al. |
| 2004/0020614 A1 | 2/2004 | Lindsay et al. |
| 2004/0038006 A1 | 2/2004 | Biagiotti |
| 2004/0044320 A1 | 3/2004 | Kainth et al. |
| 2004/0045685 A1 | 3/2004 | Horner et al. |

| | | |
|---|---|---|
| 2004/0048542 A1 | 3/2004 | Thomaschefsky et al. |
| 2004/0055721 A1 | 3/2004 | Hilbig |
| 2004/0060664 A1 | 4/2004 | Lichtenberg et al. |
| 2004/0062916 A1 | 4/2004 | Mansson |
| 2004/0089433 A1 | 5/2004 | Propst et al. |
| 2004/0102528 A1 | 5/2004 | Walchuk et al. |
| 2004/0118532 A1 | 6/2004 | Sarbo et al. |
| 2004/0123963 A1 | 7/2004 | Chen et al. |
| 2004/0140047 A1 | 7/2004 | Sato et al. |
| 2004/0163783 A1 | 8/2004 | Muller |
| 2004/0166290 A1 | 8/2004 | Sembritzki et al. |
| 2004/0200590 A1 | 10/2004 | Wilhelm |
| 2004/0206274 A1 | 10/2004 | Kruckel |
| 2004/0206445 A1 | 10/2004 | Butterworth et al. |
| 2004/0206467 A1 | 10/2004 | Lindgren et al. |
| 2004/0221976 A1 | 11/2004 | Williams et al. |
| 2004/0250969 A1 | 12/2004 | Luu et al. |
| 2005/0034826 A1 | 2/2005 | Hu |
| 2005/0034828 A1 | 2/2005 | Graff et al. |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0098286 A1 | 5/2005 | Williams et al. |
| 2005/0103456 A1 | 5/2005 | Hein et al. |
| 2005/0124704 A1 | 6/2005 | Rasheed et al. |
| 2005/0155731 A1 | 7/2005 | Martin et al. |
| 2005/0178515 A1 | 8/2005 | Ryan et al. |
| 2005/0224200 A1 | 10/2005 | Bouchard et al. |
| 2005/0230069 A1 | 10/2005 | Hilbig |
| 2005/0241788 A1 | 11/2005 | Baggot et al. |
| 2005/0247397 A1 | 11/2005 | Kraus et al. |
| 2005/0251098 A1 | 11/2005 | Wyss et al. |
| 2005/0257879 A1 | 11/2005 | Fisher et al. |
| 2005/0263234 A1 | 12/2005 | Shih |
| 2005/0274470 A1 | 12/2005 | Shannon et al. |
| 2005/0276956 A1* | 12/2005 | Zink et al. ..................... 428/198 |
| 2005/0287340 A1 | 12/2005 | Morelli et al. |
| 2006/0005916 A1 | 1/2006 | Stelljes et al. |
| 2006/0013998 A1 | 1/2006 | Stelljes |
| 2006/0037512 A1 | 2/2006 | Pawlowska et al. |
| 2006/0042767 A1 | 3/2006 | Bhat et al. |
| 2006/0062972 A1 | 3/2006 | Lefebvre et al. |
| 2006/0070712 A1 | 4/2006 | Runge et al. |
| 2006/0144541 A1 | 7/2006 | Nickel et al. |
| 2006/0191656 A1 | 8/2006 | Buzza et al. |
| 2006/0231224 A1* | 10/2006 | Gelli et al. ..................... 162/124 |
| 2006/0269706 A1 | 11/2006 | Shannon et al. |
| 2006/0289136 A1 | 12/2006 | Doherty et al. |
| 2006/0289137 A1 | 12/2006 | Gelman et al. |
| 2007/0062658 A1 | 3/2007 | Wiwi et al. |
| 2008/0003384 A1 | 1/2008 | Murphy et al. |
| 2008/0044644 A1 | 2/2008 | Luu et al. |
| 2008/0156449 A1 | 7/2008 | Williams et al. |
| 2008/0248284 A1 | 10/2008 | Williams et al. |
| 2008/0265222 A1 | 10/2008 | Ozersky et al. |
| 2009/0162611 A1 | 6/2009 | Ward et al. |
| 2010/0147473 A1* | 6/2010 | Ward et al. ..................... 162/111 |
| 2010/0212848 A1 | 8/2010 | Hilbig et al. |
| 2010/0272965 A1* | 10/2010 | Schinkoreit et al. ........... 428/172 |
| 2011/0020618 A1* | 1/2011 | Brennan et al. ................ 428/196 |

FOREIGN PATENT DOCUMENTS

| | | |
|---|---|---|
| EP | 0144658 | 6/1985 |
| EP | 0436170 | 7/1991 |
| EP | 0476976 | 3/1992 |
| EP | 1103522 | 5/2001 |
| EP | 1632604 | 3/2006 |
| FR | 2 075 452 | 10/1971 |
| FR | 2 321 389 | 3/1977 |
| FR | 2928383 A1 * | 9/2009 |
| GB | 1059746 | 2/1967 |
| GB | 1185227 | 3/1970 |
| GB | 2119709 | 11/1983 |
| GB | 2376436 | 12/2002 |
| GB | 2380447 | 4/2003 |
| JP | 2008/272267 | 11/2008 |
| WO | WO 98/40207 | 9/1998 |
| WO | WO 98/42289 | 10/1998 |
| WO | WO 00/00698 | 1/2000 |
| WO | WO 00/15907 | 3/2000 |
| WO | WO 01/12902 | 2/2001 |
| WO | WO 0114143 A1 * | 3/2001 |
| WO | WO 02/12622 | 2/2002 |
| WO | WO 2004/044320 | 5/2004 |
| WO | WO 2006044117 | 4/2006 |
| WO | WO 2010011646 | 1/2010 |

OTHER PUBLICATIONS

C. O. Au and I. Thorn in "Applications of Wet-End Paper Chemistry", 1995, Blackie Academic & Professional and imprint of Chapman & Hall, First edition, pp. 102-119.

Hardell, Hanne-Lise et al., "A New Method for the Analysis of AKD Oligomers in Papermaking Systems," 17 Nordic Pulp and Paper Research Journal 3, 340-345 (2002).

Written Opinion of the International Searching Authority that issued in PCT/FR2009/000231 on Aug. 29, 2006.

European Search Report for Application PCT/FR2009/000231.

* cited by examiner

EMBOSSED SHEET COMPRISING A PLY OF WATER-SOLUBLE MATERIAL AND METHOD FOR MANUFACTURING SUCH A SHEET

The invention proposes an embossed sheet comprising at least one ply of tissue and at least one ply of water-soluble material.

The invention proposes more particularly an embossed sheet comprising at least one ply of tissue having an embossing pattern comprising at least one series of protuberances formed and projecting from one surface of the said ply of tissue, and comprising at least one ply of water-soluble material.

The ply of water-soluble material is prepared so as to form a impermeable barrier to liquids, microorganisms such as bacteria and viruses contained in these liquids.

The function called "impermeable" of the barrier formed by the water-soluble ply consists here in temporarily preventing the liquids from passing through the said ply.

Thus, the use of a ply of water-soluble material, in combination with at least one ply of tissue, serves to obtain a product comprising, on the one hand, the absorbent properties of the tissue ply and, on the other, the waterproofness procured by the ply of water-soluble material.

These properties are particularly advantageous for the use of a paper product as a facial tissue or as bathroom tissue, because the bacteria and/or viruses cannot be transferred to the user's hand.

Moreover, when the paper product is used as bathroom tissue, each of the various plies constituting the paper product is suitable for being dispersed in the water, when the product is discarded into the toilet, without the risk of blocking the pipes.

Document GB-B-1 185 227 describes such a paper product, for which the ply of water-soluble material is prepared by hot extrusion and is hot bonded to the tissue plies discharged from the extruder, so that the tissue plies partly absorb the water-soluble material which has not yet hardened.

However, such a manufacturing method is relatively complicated to set up, and this document does not specifically describe the connection between the ply of water-soluble material and each ply of tissue.

It is the object of the invention to propose a paper product comprising a ply of water-soluble material which is joined to at least one ply of tissue so that the product has the usual properties of such a paper product.

For this purpose, the invention proposes an embossed sheet of the type described previously, characterized in that the ply of water-soluble material is joined to the said at least one ply of tissue at the summits of at least part of the protuberances.

According to other features of the sheet according to the invention, taken separately or in combination:

the ply of water-soluble material is joined to the said at least one ply of tissue by local dissolution of the ply of water-soluble material, at the summits of the said at least part of the protuberances, to which the ply of water-soluble material is joined;

the surface of the ply of water-soluble material is suitable for being dissolved for the joining of the ply of water-soluble material to the said at least one ply of tissue;

the ply of water-soluble material is suitable for being dissolved locally by a water-based liquid;

the liquid comprises water and an additive;

the liquid is water;

each of the said summits of the said at least part of the protuberances is suitable for being humidified before the joining of the ply of tissue to the ply of water-soluble material, to cause the partial dissolution of the ply of water-soluble material at the contact with the said summit of the said at least part of the protuberances;

the ply of water-soluble material is joined to the said at least one ply of tissue by adhesion of the water-soluble material to the said summits of the said at least part of the protuberances;

the sheet comprises at least two plies of tissue each having an embossing pattern which comprises at least one series of protuberances oriented inwardly from the sheet and the ply of water-soluble material is arranged between the said at least two plies of tissue and is joined to each of the said two plies at the summits of at least part of the protuberances of each of the said two plies of tissue;

the ply of water-soluble material is based on an at least partially hydrolysed polyvinyl alcohol;

the ply of water-soluble material is based on an at least 90% hydrolysed polyvinyl alcohol;

the thickness of the ply of water-soluble material is less than 25 μm;

the ply of water-soluble material is embossed and comprises at least one series of protuberances;

the ply of water-soluble material comprises perforations and/or micro-perforations.

It is a further object of the invention to propose a method for manufacturing an embossed sheet according to the invention, comprising at least one ply of tissue and at least one ply of water-soluble material, characterized in that it consists in embossing at least one ply of tissue to form protuberances on one surface of the said at least one ply of tissue and then in joining the ply of water-soluble material to the summits of at least part of the protuberances of the said at least one ply of tissue.

According to other features of the method, taken separately or in combination:

the summits of the protuberances of the said at least part of the protuberances are coated with adhesive before the joining of the ply of water-soluble material to the said at least one ply of tissue;

the summits of the protuberances of the said at least part of the protuberances are humidified before the joining of the ply of water-soluble material to the summits of the protuberances to cause a local dissolution of the surface of the ply of water-soluble material upon its contact with the humidified summits;

the surface of the ply of water-soluble material located opposite the ply of tissue is humidified locally before the joining of the ply of water-soluble material to the said at least one ply of tissue;

the said surface of the ply of water-soluble material is humidified at the summits of the protuberances of the said at least one ply of tissue;

the ply of water-soluble material is embossed before its joining to the said at least one ply of tissue;

the ply of water-soluble material comprises perforations and/or micro-perforations which are produced before the embossing of the ply of water-soluble material;

the method is suitable for manufacturing a sheet which comprises at least one first and at least one second ply of tissue between which the ply of water-soluble material is arranged, and the ply of water-soluble material is joined simultaneously to the said at least one first ply of tissue and to the said at least one second ply of tissue during an operation for joining the plies.

Other features and advantages of the invention will appear from a reading of the detailed description that follows, for an understanding of which reference should be made to the appended figures in which.

Figure 1:
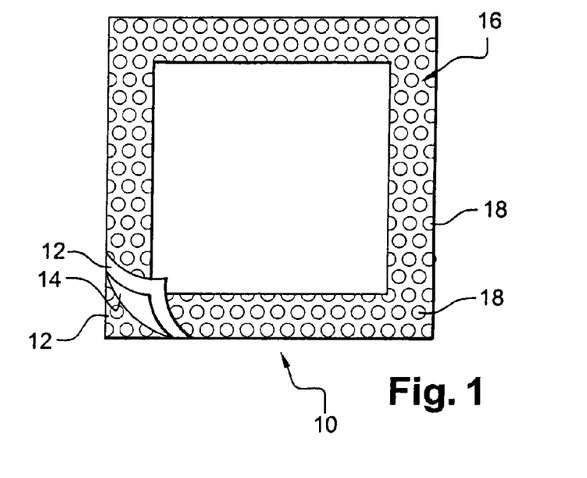
FIG. 1 is a schematic representation of an embossed sheet according to the invention comprising two plies of tissue and an intermediate ply of water-soluble material.
Figure 2:
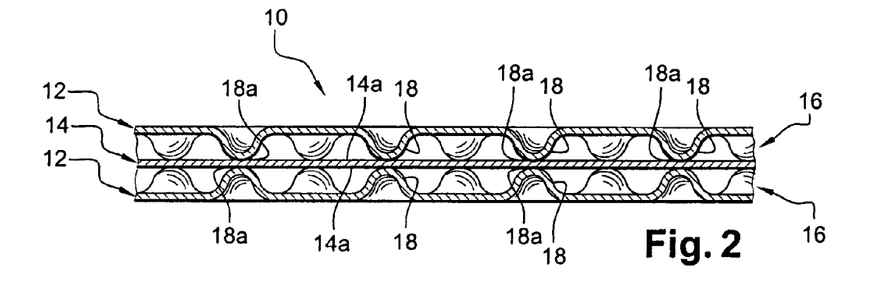
FIG. 2 shows a section of the sheet shown in FIG. 1, showing the protuberances of the plies.
Figure 3:
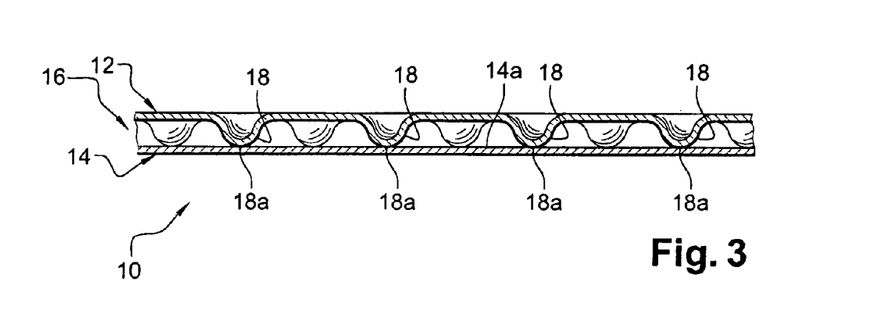
FIG. 3 shows a section of the sheet comprising a single ply of tissue and one ply of water-soluble material.

FIGS. 1, 2 and 3 show a paper product 10 such as an embossed sheet comprising a plurality of superimposed plies 12, 14.

The sheet 10 is, for example, a sheet of bathroom tissue or a disposable facial tissue.

In a first embodiment shown in FIGS. 1 and 2, the sheet 10 comprises two plies 12 of tissue and one ply 14 prepared from water-soluble material arranged between the two tissue plies 12.

In a second embodiment shown in FIG. 3, the sheet 10 comprises a ply 12 of tissue and a ply 14 prepared from water-soluble material.

It will be understood that the invention is not limited to these embodiments of the embossed sheet 10, which may comprise a larger number of plies 12 of tissue and/or a larger number of plies 14 of water-soluble material.

Furthermore, a ply 12 of tissue may comprise a group of plies joined together so as to behave like a single ply.

Each ply 12 of tissue is prepared in a conventional manner, for example by conventional wet pressing called CWP, and its basis weight is adapted to the use of the sheet, for example the basis weight of the tissue ply 12 is between 12 and 30 g/m$^2$.

The ply 14 of water-soluble material is prepared from a material suitable for being dissolved after prolonged contact with water. It consists of a plastic, preferably a polyvinyl alcohol (PVA) which is a polyvinyl acetate (PVAc), that has been hydrolysed to become water-soluble.

A modification of the hydrolysis rate of the ply 14 of water-soluble material serves to modify the time required for the dissolution of the ply 14 of water-soluble material. Thus, it is possible to adjust this hydrolysis rate according to the desired properties of the sheet 10.

Preferably, the hydrolysis rate of the plastic is higher than ninety percent (90%).

Another property of the water-soluble material used to form the ply 14 further consists in that the material is non-porous and is suitable for forming a sealed barrier to liquids, before its dissolution.

Thus, the liquids and microorganisms such as bacteria and/or viruses applied to one surface of the sheet 10 cannot be transferred to the other surface of the sheet which is, for example, in contact with the user's hand, thereby serving to ensure a hygienic use of the sheet 10, in particular when the sheet 10 is used as a facial tissue or bathroom tissue, as previously mentioned.

The thickness of the ply 14 of water-soluble material is preferably lower than 25 μm.

Finally, according to an alternative embodiment of the embossed sheet 10, the ply 14 of water-soluble material comprises perforations and/or micro-perforations.

These perforations and/or micro-perforations serve in particular to increase the absorption rate of the sheet 10 and to improve its flexibility.

The sheet 10 is an embossed sheet, that is at least one of the plies 12, 14 comprises at least one embossing pattern.

According to a common definition, embossing is a mechanical operation of deformation which modifies the relief of a sheet.

According to the embodiments shown in FIGS. 1 to 3, each ply 12 of tissue comprises an embossing pattern 16 which extends over part of the surface of the ply 12 and which comprises a plurality of protuberances 18 oriented inwardly from the sheet 10.

Furthermore, according to these embodiments, the ply 14 of water-soluble material is flat, that is it does not comprise any embossing pattern.

Figures 4, 5:
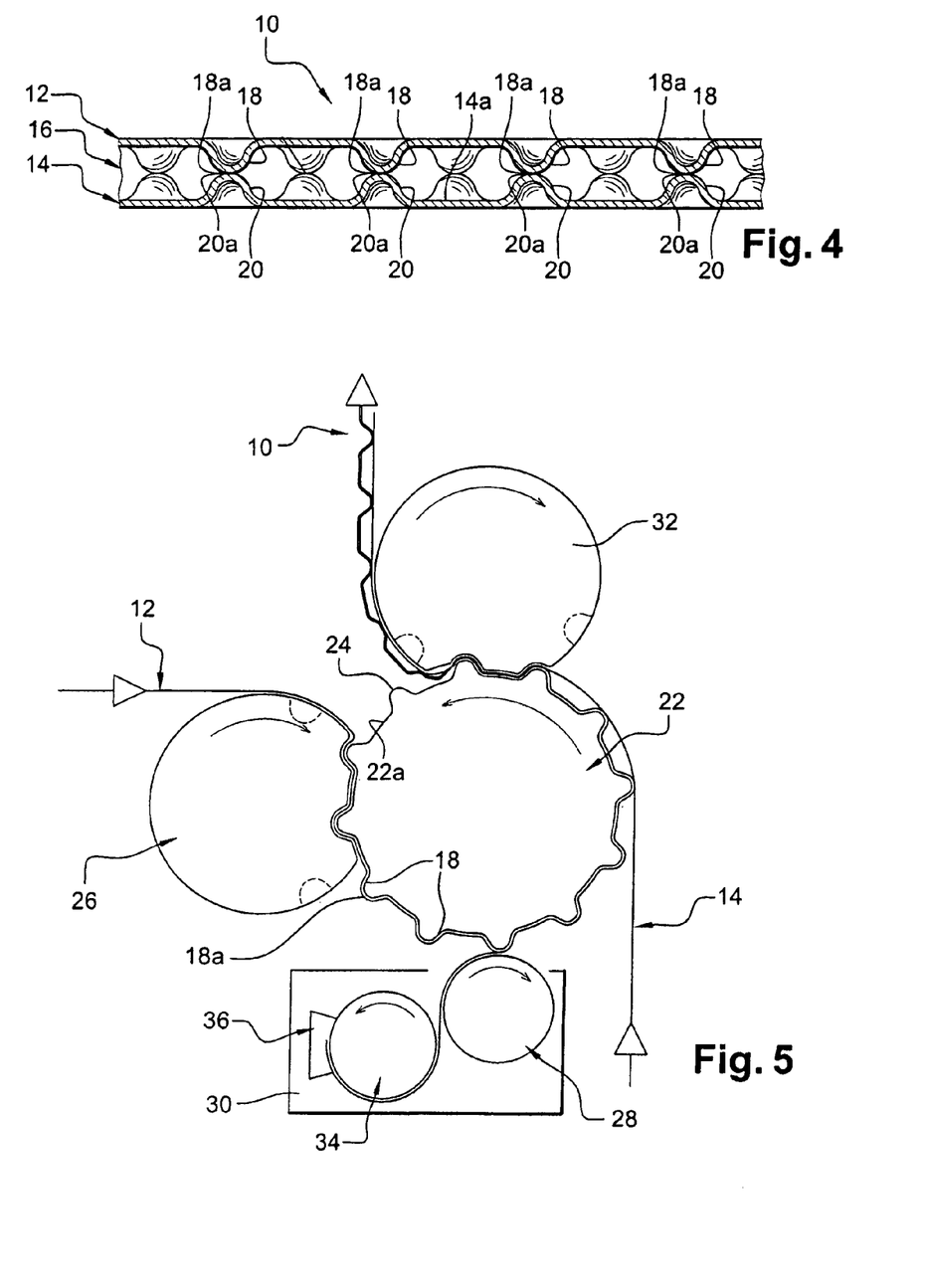
FIG. 4 shows a similar section to that of FIG. 2, showing an alternative embodiment of the invention, for which the ply of water-soluble material comprises protuberances.
FIG. 5 is a schematic representation of an installation for producing an embossed sheet according to the invention as shown in FIG. 3.

According to the embodiment shown in FIG. 4, the ply 12 of tissue and the ply 14 of water-soluble material each comprise an embossing pattern composed of a plurality of protuberances 18, 20.

Here, each ply 12, 14 comprises a single embossing pattern and the relief of the protuberances caused by the embossing is identical for the two plies 12, 14. According to an alternative embodiment, at least one ply 12, 14 comprises a plurality of embossing patterns 16, forming for example a background pattern and a main pattern.

The height and density of the protuberances 18, 20 of a pattern 16 may be different from the height of the protuberances 18, 20 of the other pattern 16, thereby serving to procure for the sheet 10 desired properties of softness, absorption and flexibility.

Furthermore, here, the plies 12, 14 are joined together by a joining mode known by the designation points/points, that is, in such a way that the summits 18a, 20a of the protuberances of each of the plies 12, 14 are caused to coincide.

According to an alternative embodiment, not shown, the plies 12, 14 may be joined by the technique called "nested", for which the protuberances are imbricated.

According to the invention, each ply 12 of tissue is joined to the ply 14 of water-soluble material at the summits 18a of at least part of the protuberances 18.

According to a first embodiment of the invention, the joining of each ply 12 of tissue to the ply 14 of water-soluble material is carried out by bonding all or part of the summits 18a of the protuberances 18 of each ply 12 of tissue to the opposite surface 14a of the ply 14 of water-soluble material.

Preferably, the bonding takes place by depositing adhesive on all or part of the summits 18a of the protuberances 18 before the plies 12, 14 are contacted with one another.

According to a preferred embodiment of the invention, the joining of each ply 12 of tissue to the ply 14 of water-soluble material is carried out by partial dissolution of the ply 14 of water-soluble material, at the summits 18a of the protuberances 18.

The partial dissolution of the ply 14 of water-soluble material is obtained by locally applying a water-based liquid to the ply 14 of water-soluble material.

The water-soluble material has the cohesion, or the behaviour, of a solid when it is dehydrated, and the cohesion of a viscous liquid when it is hydrated, that is when it is mixed with water.

When the summit 18a of a protuberance of the ply 12 of tissue is in contact with the partially dissolved zone of the ply 14 of water-soluble material, the summit 18a absorbs part of the dissolved water-soluble material. The tissue and the water-soluble material are thereby mixed.

Then, the two plies are joined together by pressing and then by natural or forced dehydration so that the contact zones between the plies 12, 14 become joining zones between the said plies following the cohesion thereby created.

According to a first embodiment, the product used to cause the partial dissolution of the water-soluble material is exclusively water, so that the ply 12 of tissue is joined to the ply 14 of water-soluble material exclusively by the quantity of water-soluble material that has been dissolved.

According to an alternative embodiment, the product used to cause the partial dissolution of the water-soluble material consists of a mixture of water and an additive such as adhesive, which serves to improve the joining of the ply 12 of tissue to the ply 14 of water-soluble material.

Furthermore, the quantity of liquid used to cause a local dissolution of the ply 14 of water-soluble material, is determined so that only the outer surface of the ply 14 of water-soluble material is dissolved, that is a central portion, in the thickness of the ply 14 of water-soluble material, is not dissolved. This serves in particular to preserve the impermeability function of the ply 14 of water-soluble material over its whole surface.

Such a feature of dissolution of the ply 14 of water-soluble material exclusively on the surface is preferably obtained by first humidifying the summits 18a of the protuberances 18, so that the quantity of liquid that dissolves the ply 14 of water-soluble material is limited, and the dissolution occurs when each ply 12 of tissue is placed in contact with the ply 14 of water-soluble material.

The ply 14 of water-soluble material is thereby placed in contact with the bonding liquid for a limited period of time.

When the ply 14 of water-soluble material is arranged between two plies 12 of tissue, as shown in FIGS. 1 and 2, each surface of the ply 14 of water-soluble material is joined to a ply 12 of tissue according to the invention, that is, the ply 14 of water-soluble material is joined to summits 18a of protuberances 18 of a ply 12 of tissue, which extends inwardly from the sheet 10, towards the ply 14 of water-soluble material.

By contrast, when the ply 14 of water-soluble material is joined to a single ply 12 of tissue, as shown in FIGS. 3 and 4, only one surface of the ply 14 of water-soluble material is joined to the ply 12 of tissue according to the invention, that is, the surface of the ply 14 of water-soluble material located opposite the ply 12 of tissue is joined to the summits 18a of all or part of the protuberances 18 of the said ply 12 of tissue.

FIG. 5 shows an installation for producing a sheet according to the invention.

This installation is constructed here in order to produce a sheet 10 comprising a single ply 12 of tissue which is embossed, and comprising a ply 14 of water-soluble material which is flat, as shown in FIG. 4.

The installation comprises an engraved embossing roller 22 of which the convex outer cylindrical surface 22a comprises a series of pins 24 formed in relief and of which the form or outer profile is identical to that which is to be obtained for each corresponding protuberance 18 of the ply 12 of tissue.

In a manner known per se, the ply 12 of tissue first passes between the first engraved roller 22 and an associated roller 26 to produce the embossing pattern of this ply 12. The associated roller 26 may have a rubber coating or similar, or optionally a rigid coating having a hardness lower than the hardness of the engraved roller 22.

The ply 12 of tissue then passes in front of the applicator roller 28 belonging to a coating unit 30, of known design, which deposits a bonding product on the summits 18a of the protuberances 18.

The coating unit 30 serves to deposit the bonding product on all the summits 18a of the protuberances 18, or on only part of the summits 18a of the protuberances 18, in particular on the summits 18a of the protuberances 18 which are the highest when the ply 12 of tissue comprises a plurality of embossing patterns 16 having different heights.

According to the invention, and as previously described, the bonding product may be adhesive, water or a mixture of water with a binder, and is referred to below by the term bonding product.

In a manner known per se, the coating installation 30 comprises an engraved roller 34, commonly called "anilox", of which the cylindrical surface comprises cavities (not shown) which are suitable for being filled with bonding product, during the passage thereof in front of a tank 36 for then transferring the bonding product to the applicator roller 28.

The anilox 34 serves to transfer the bonding product in a predefined and controlled manner onto the applicator roller 28. This serves to limit the quantity of bonding product in motion.

The cavities of the anilox 34 are preferably such as to have a volume of between 3 and 40 $cm^3/m^2$.

The ply 14 of water-soluble material is then placed in contact with the ply 12 of tissue.

Then, the two plies 12 and 14 pass into a "nip" between the embossing roller 22 and a roller 32, called marrying roller, to associate the plies 12, 14 by the pressure of the marrying roller 32 against the embossing roller 22.

Thus, the method for manufacturing an embossed sheet 10 according to the invention via this installation comprises a first step of embossing of the ply 12 of tissue, to produce at least one embossing pattern 16 consisting of protuberances 18 on one surface of the said ply 12.

This embossing step is implemented by the cooperation of the engraved roller 22 with the associated roller 26.

This method also comprises a step of joining the ply 12 of tissue to the ply 14 of water-soluble material, here by cooperation of the engraved roller 22 with the marrying roller 32.

According to the invention, the step of embossing the ply 12 of tissue is implemented before the step of joining the ply 12 of tissue to the ply 14 of water-soluble material. Moreover, also according to the invention, the bonding step consists in joining the ply 12 of tissue to the ply 14 of water-soluble material at the summits 18a of the protuberances 18.

For this purpose, the coating installation 30 deposits the bonding product before the joining of the ply 12 of tissue to the ply 14 of water-soluble material.

Thus, when the bonding product is water-based, the ply 14 of water-soluble material is only locally dissolved when it is placed in contact with the ply 12 of tissue of which the summits 18a of the protuberances 18 have been humidified.

This serves to limit and control the extent of the dissolution of the ply 14 of water-soluble material, so as to avoid weakening its properties excessively, particularly the impermeability properties.

According to an alternative embodiment of the method of the invention, the bonding product is applied to the ply 14 of water-soluble material, before its joining to the ply 12 of tissue.

The installation is then modified accordingly, that is, the coating installation 30 is arranged to apply the bonding product directly to the ply 14 of water-soluble material.

When the ply 14 of water-soluble material passes opposite the ply 12 of tissue, the latter has been formed to have the properties previously mentioned, that is, the material has been partly hydrolysed.

Furthermore, in the case in which the ply 14 of water-soluble material comprises perforations or micro-perforations, they are generally produced before the ply 14 of water-soluble material reaches the installation as described previously.

Preferably, the micro-perforations in the context of the present invention have a density lower than $150/cm^2$ and their diameter is smaller than 1 mm.

Moreover, according to the embodiment of the embossed sheet 10 according to which the ply 14 of water-soluble material is also embossed, as shown in FIG. 4, the embossing is carried out before it is placed in contact with the ply 12 of tissue. For this purpose, the installation comprises an additional embossing unit (not shown).

The same applies for manufacturing the embossed sheet shown in FIG. 2, which comprises two plies 12 of tissue between which the ply 14 of water-soluble material is arranged.

The installation then comprises an engraved roller 22 and a coating unit 30 as described previously, associated with each ply 12 of tissue.

The ply 14 of water-soluble material is then placed opposite each of the two plies 12 of tissue, for it to be arranged between them.

Then, all the plies 12, 14 pass simultaneously in front of the matching roller 32 in order to associate the ply 14 of water-soluble material simultaneously with the two plies 12 of tissue.

The embossed sheet according to the invention thereby procures better temporary protection in comparison with a "conventional" sheet, that is one which does not comprise a ply of water-soluble material, and preserves conventional disintegration properties after use, that is, when it is discarded into the discharge lines of sanitary facilities.

The comparative table below shows the results of various measurements between a multi-ply sheet, for use as bathroom tissue, of which the design is called "conventional", and which comprises three plies of tissue, and a multi-ply sheet according to the invention.

More precisely, the multi-ply sheet called "conventional three-ply paper" in the table comprises two outer plies of the CWP type and one central ply having a mechanical strength greater than that of the two outer plies.

The multi-ply sheet called "invention" in the table is manufactured according to the invention, and differs from the sheet called "conventional three-ply paper" only in terms of the central ply, which consists here of a ply of water-soluble material.

|  |  | Conventional three-ply bathroom tissue | Invention |
|---|---|---|---|
| Thickness (mm) | As such | 0.354 ± 0.006 | 0.524 ± 0.030 |
|  | In 12 plies | 0.323 ± 0.003 | 0.491 ± 0.013 |
| Absorption | Capacity (g/g) | 9.3 | 11.8 |
|  | Time (s) | 4 | 5 |
| Disintegration | (s) | 8 | 20 to 25 |
| Strength | (N/m) | — | — |
| MD dry |  | 199 ± 7 | >899 |
| MD wet |  | 4.7 ± 0.7** | 8.0 ± 1.1 (12.9 ± 1.4)** |
| CD dry |  | 81 ± 5 | 281 ± 10 |
| CD wet |  | — | — |
| MD elongation | % | 19 | 25 to 73 |

It appears that all the measured parameters are improved, in particular the dry strength in the machine direction (MD), cross direction (CD), and the wet strength in the machine direction (MD) are improved. The elongation in the machine direction (MD) is also improved.

Moreover, the "disintegrability" function of the paper according to the invention is advantageously preserved.

The invention claimed is:

1. An embossed sheet, comprising:
   at least one ply of tissue, comprising an embossing pattern comprising a plurality of protuberances projecting from a surface of the at least one ply of tissue, the protuberances having summits; and
   at least one ply of water-soluble material joined to the at least one ply of tissue,
   wherein the at least one ply of water-soluble material is joined to the at least one ply of tissue via the summits of at least a portion of the protuberances,
   wherein the at least one ply of water-soluble material is joined to the at least one ply of tissue by partial dissolution of the at least one ply of water-soluble material, and
   wherein the at least one ply of water-soluble material comprises an at least 90% hydrolyzed polyvinyl alcohol.

2. The embossed sheet of claim 1, wherein the at least one ply of water-soluble material is configured to be locally dissolved by a water-based liquid.

3. The embossed sheet of claim 2, wherein the water-based liquid comprises water and an additive.

4. The embossed sheet of claim 2, wherein the water-based liquid is water.

5. The embossed sheet of claim 1, wherein the summits are configured to be humidified such that the humidified summits at least partially dissolve the at least one ply of water-soluble material upon contact.

6. The embossed sheet of claim 1, wherein the at least one ply of water-soluble material is joined to the at least one ply of tissue by adhesion of the water-soluble material to the summits of at least a portion of the protuberances.

7. The embossed sheet of claim 1, wherein the thickness of the at least one ply of water-soluble material is less than 25 μm.

8. The embossed sheet of claim 1, wherein the ply of water-soluble material is embossed and comprises a plurality of protuberances.

9. The embossed sheet of claim 1, wherein the ply of water-soluble material comprises perforations and/or micro-perforations.

10. An embossed sheet comprising:
    at least two plies of embossed tissue, wherein each ply of tissue comprises a plurality of protuberances, and wherein the plurality of protuberances comprise summits; and
    at least one ply of water-soluble material arranged between the two plies of tissue and joined to the summits of at least a portion of the protuberances on each ply of tissue by partial dissolution of the at least one ply of water-soluble material, wherein the at least one ply of water-soluble material comprises an at least 90% hydrolyzed polyvinyl alcohol.

* * * * *